US012687251B2

(12) United States Patent
Carvalheira Mazzei et al.

(10) Patent No.: US 12,687,251 B2
(45) Date of Patent: Jul. 21, 2026

(54) RESIDENT SUBSEA PIG LAUNCHER AND RECEIVER STATION

(71) Applicant: Petróleo Brasileiro S.A. - Petrobras, Rio de Janeiro (BR)

(72) Inventors: Gustavo Carvalheira Mazzei, Rio de Janeiro (BR); Carlos Alexandre Pereira Patusco, Rio de Janeiro (BR); Pedro Nogueira Addor, Rio de Janeiro (BR); Jeter Pacheco De Freitas, Rio de Janeiro (BR); Camila Do Nascimento Gomes, Rio de Janeiro (BR); Daniel Pozzani, Rio de Janeiro (BR); Fernando Borja Pereira, Rio de Janeiro (BR)

(73) Assignee: Petróleo Brasileiro S.A. - Petrobras, Rio de Janeiro (BR)

( * ) Notice: Subject to any disclaimer, the term of this patent is extended or adjusted under 35 U.S.C. 154(b) by 471 days.

(21) Appl. No.: 18/061,040

(22) Filed: Dec. 2, 2022

(65) Prior Publication Data

US 2023/0175631 A1 Jun. 8, 2023

(30) Foreign Application Priority Data

Dec. 3, 2021 (BR) ...................... 10 2021 024556 5

(51) Int. Cl.
F16L 55/46 (2006.01)
F16L 101/30 (2006.01)
(52) U.S. Cl.
CPC ........... F16L 55/46 (2013.01); F16L 2101/30 (2013.01)

(58) Field of Classification Search
CPC ......... F16L 55/46; F16L 55/38; F16L 23/003; F16L 23/006
See application file for complete search history.

(56) References Cited

U.S. PATENT DOCUMENTS

| | | | | |
|---|---|---|---|---|
| 4,401,133 A | * | 8/1983 | Lankston | ................ B08B 9/055 |
| | | | | 15/104.062 |
| 5,219,244 A | * | 6/1993 | Skeels | ..................... F16L 55/46 |
| | | | | 15/104.062 |

(Continued)

FOREIGN PATENT DOCUMENTS

WO 2021083548 A1 5/2021

*Primary Examiner* — Benjamin F Fiorello
(74) *Attorney, Agent, or Firm* — Morrison & Foerster LLP

(57) ABSTRACT

The present invention proposes a resident station of launching and receiving subsea pigs installed in place of THE PLET, in order to enable the application of subsea rigid pipes and the full compliance with the routine internal inspection requirement for monitoring internal corrosion, through bi-directional pigging, mitigating existing operational risks in this type of operation. The invention enables the safe bi-directional pigging of a non-pigable pipe by installing the proposed equipment at the end of the subsea rigid pipe, connecting the pipeline to the main branch in order to ensure shutdown of the pig until the flow is reversed, importing gas from the main branch pipeline, causing the pig to return and be received in the launcher/receiver residing at the FPSO. Thus, the equipment can safely guarantee the periodic and instrumented bi-directional pigging of the pipeline, acting as a launcher/receiver (FIG. 1) residing and aligned to the pipe.

9 Claims, 1 Drawing Sheet

(56)         References Cited

U.S. PATENT DOCUMENTS

| | | | |
|---|---|---|---|
| 5,437,302 A * | 8/1995 | Da Silva | F16L 55/46 |
| | | | 15/104.062 |
| 10,663,085 B2 | 5/2020 | Pinho et al. | |
| 10,801,658 B2 * | 10/2020 | Poe | F16L 41/004 |
| 2008/0263796 A1 * | 10/2008 | Morris | B08B 9/0551 |
| | | | 15/104.062 |
| 2016/0369930 A1 * | 12/2016 | Poe | F16L 55/46 |
| 2020/0208770 A1 * | 7/2020 | Haneferd | F16L 55/46 |
| 2020/0292136 A1 * | 9/2020 | Long, III | G05B 23/021 |
| 2021/0262604 A1 | 8/2021 | Hestetun | |
| 2021/0332953 A1 * | 10/2021 | Jagannathan | F17D 5/06 |
| 2022/0373123 A1 * | 11/2022 | Hestetun | F16L 55/46 |

* cited by examiner

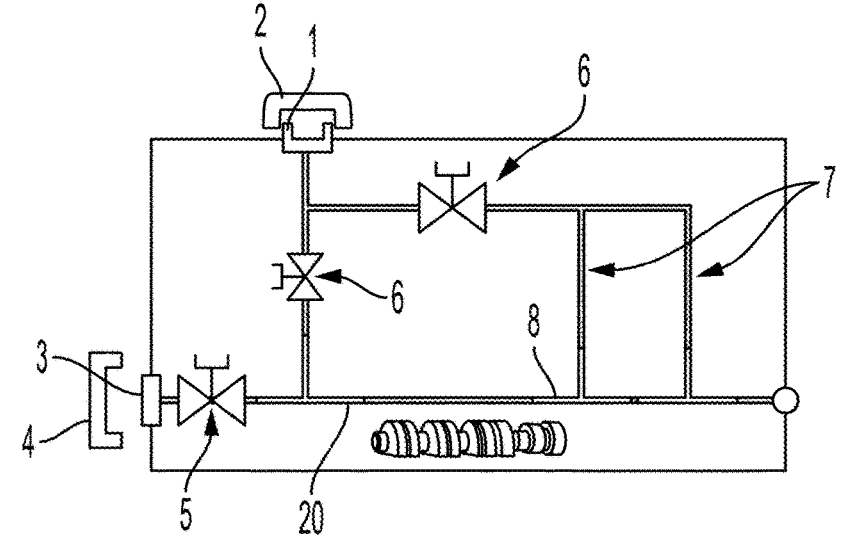
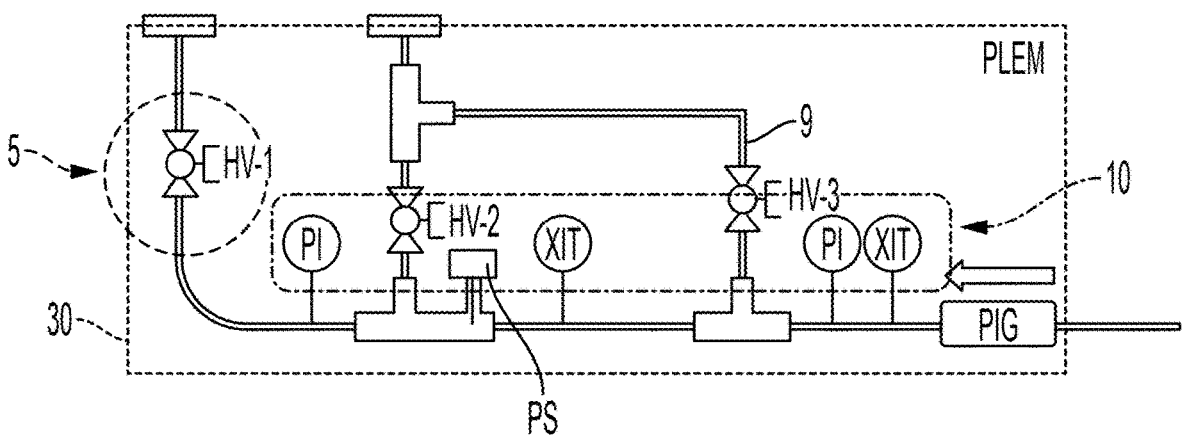

RESIDENT SUBSEA PIG LAUNCHER AND RECEIVER STATION

CROSS-REFERENCE TO RELATED APPLICATION

This application claims priority to Brazilian Application No. 10 2021 024556 5, filed on Dec. 3, 2021, and entitled "RESIDENT SUBSEA PIG LAUNCHER AND RECEIVER STATION," the disclosure of which is incorporated herein by reference in its entirety.

FIELD OF THE INVENTION

The present invention is related to the field of the feasibility of passing pigs into undersea rigid pipelines and the routine internal inspection for monitoring corrosion.

DESCRIPTION OF THE STATE OF THE ART

To enable the fulfillment of the inherent integrity requirements for the application of subsea rigid pipelines (SRP) made of carbon steel without a lining into the branches of export gas pipelines that interconnect the FPSOs to the flow line of the Santos Basin Pre-Salt, which originally adopted as a premise the application of flexible pipes only in these branches, as they do not require pigging as compared to rigid pipes. During the conceptual design of this mesh, this requirement was fundamental for the optimization of diameters and costs of these branches, however from production designs of other fields there was the need to seek for more attractive solutions to flexible pipes, such as the use of DRS on these branches, such that: (i) an alternative to flexible pipes; (ii) increased competitiveness between (rigid×flexible) technologies; (iii) fostering greater interest in the EPCist market; (iv) to enable instrumented pigging in non-pigable rigid pipes, providing an alternative to flexible pipes, possibly being susceptible to the SCC-CO2 phenomenon (phenomenon of CO2 activated medium-assisted cracking in the annular space, which is designated as CO2 Stress Corrosion).

Subsea rigid pipes are known to have as a critical failure mode the loss of containment due to internal corrosion caused by the material susceptibility. Because of this, in the design of these systems it is necessary to ensure pigability and predict in its integrity management plan an internal inspection routine for internal corrosion using tools known as instrumented Pigs. Conventionally, this operation requires Pigs to be launched from one source and being received at a destination on the surface.

The intended application of this technology (DRS) in the above scenario causes the required pigability requirements to be compromised, this branch being by design deemed non pigable in the conventional manner. Alternatives, such as those listed below, can be considered technically feasible: (i) application of an internal lining not susceptible to corrosion; (ii) or bi-directional pigging; (iii) or installation of subsea pig launchers, (iv) installation of subsea pig receivers.

However, such alternatives can bring high CAPEX and OPEX values and increased operational risks as well as imprisonment of the Pigs during the operational phase of these pipes. For the proposed scenario, due to having short pipeline passages, these risks and costs are overestimated and without option, the project ends up opting for the application of flexible pipes or DRS internally coated with Inconel 625 and, in this latter alternative, there are risks inherent to the need for an eventual pigging throughout the service life of the pipe.

Document U.S. Ser. No. 10/663,085B2 discloses a subsea pipeline station configured to establish fluid communication between a first pipeline and a second pipeline. The first pipeline may have a first diameter, and the second pipeline may have a second diameter different from the first diameter. Additionally, the subsea pipeline station may be configured to removably couple to one or more pig launching assemblies having different configurations.

Document WO2021083548A1 discloses a pig launcher comprising a tubular pig housing holding several pigs in line and a pipe inlet for each of the number of pigs spaced along a longitudinal axis of the tubular pig housing. A main connector is connected to a fluid flow line at an end of the tubular pig housing. A kicker valve is provided for each number of pigs, each kicker valve including a control pressure inlet, a flow inlet and a flow outlet; a kicker valve control pipe is connected to the pressure inlet on each of the kicker valves and a kicker system connector. A kicker header is connected to the flow inlet of each of the kicker valves. A kicker bypass tube is connected between the flow outlet of each of the kicker valves and the inlet of the kicker bypass tube for each of the numbers of pigs.

Document US20210262604A1 discloses a pig launcher comprising a pig magazine, a launcher mechanism and a connector being connectable to a fluid flow line.

The cited prior-arts do not disclose the ability to enable bi-directional pigging so that the pig is held until flow is reversed.

In view of the difficulties present in the aforementioned state of the art and for bi-directional pigging solutions in such a way that the pig is stopped until reversal of the flow, there is a need for developing a technology capable of performing effectively and in accordance with environmental and safety guidelines. The aforementioned state of the art does not disclose the unique features that will be presented in detail below.

OBJECT OF THE INVENTION

It is an object of the invention to enable the bi-directional pigging of a non-pigable pipe safely.

BRIEF DESCRIPTION OF THE INVENTION

The present invention proposes a resident subsea launcher and receiver pig station installed in place of the PLET, in order to enable the application of subsea rigid pipes and the full compliance with the routine internal inspection requirement for monitoring internal corrosion, through bi-directional pigging, mitigating existing operational risks in this type of operation. The invention enables the safe bi-directional pigging of a non-pigable pipe by installing the proposed equipment at the end of the subsea rigid pipe, connecting the pipeline to the main branch in order to ensure shutdown of the pig until the flow is reversed, importing gas from the main branch pipeline, causing the pig to return and be received in the launcher/receiver residing at the FPSO. Thus, the equipment can safely guarantee the periodic and instrumented bi-directional pigging of the pipeline, acting as a resident launcher/receiver being aligned to the pipeline.

BRIEF DESCRIPTION OF THE DRAWINGS

The present invention will be described in more detail below, with reference to the attached FIGURE which, in a schematic and non-limiting manner, represents an exemplary embodiment thereof. In the drawings:

FIG. 1 illustrates the resident subsea pig launcher and receiver station, such as a launcher/receiver integrated into the PLET and permanently aligned to the pipeline.

DETAILED DESCRIPTION OF THE INVENTION

Below is a detailed description of a preferred embodiment of the present invention, in an exemplifying manner that is in no way limitative. Nevertheless, possible additional embodiments of the present invention still comprised by the essential and optional features below will be evident to a skilled person from reading of this description.

A technical feasibility study was then carried out to study these alternatives, assess risks and how to mitigate them. The study concluded that the proposed analysis is technically feasible by mitigating the risks involved in the pig passage operations necessary to guarantee integrity. In order to meet the study's recommendations, it was proposed to install the equipment (that is object of the present invention) in place of the PLET (Pipeline End Termination) to enable the application of subsea rigid pipelines (DRS in carbon steel without an internal lining) and to meet the routine internal inspection requirements for monitoring internal corrosion (critical failure mode in DRS) through bi-directional pigging, mitigating the operational risks existing in this type of operation.

The equipment proposed by the invention, the Resident Subsea Pig Launcher and Receiver Station (RSPLRS), when interconnected at the end of a rigid subsea pipeline branch that does not include an internal lining as a replacement for the PLET (Pipeline End Termination), is intended to establish an integrated and permanent "launcher/receiver (20) aligned to the pipeline", hence meeting the routine internal inspection requirements for the monitoring of internal corrosion (critical failure mode in DRS) through the bi-directional pigging, mitigating the operational risks existing in this type of operation.

The proposed equipment has the following advantages: (i) it allows bi-directional pigging, that is known and applied in the market, from a FPSO; (ii) it eliminates the need for a special vessel for non-resident SPL/RPL (Subsea Pig Launcher and Receivers) installation and use of downlines, (iii) it eliminates any possible water ingress during SPL pigging operations; (iv) it allows contingency access using commissioning SPL; (v) it simplifies the operation as a whole, in addition to reducing operational costs as compared to other alternatives.

The proposed equipment enables the safe bi-directional pigging of a "non-pigable" pipe branch through the installation thereof at the end of the subsea rigid pipe, connecting the branch to the main branch pipeline, in order to ensure the pig shutdown until reversal of the flow. It imports gas from the main branch pipeline, causing the pig to return and be received in the launcher/receiver (LRP) (20) residing at the FPSO. Thus, the equipment can safely guarantee the periodic and instrumented bi-directional pigging of the pipeline(s), acting as a launcher/receiver (20) residing and aligned to the pipe. The equipment further allows the installation of a subsea pig launcher (20) having interfaces to allow access to the pipeline in case of contingency (e.g., pig trap) and can also be used for commissioning the pipe(s).

Below are the components, functions and features thereof:
1) Main Hub: Responsible for the interconnection via a rigid jumper to the interface equipment to Rota 3 (PLET/ILT, PLEM), non-pigable, having an ASD internal diameter, compatible with the other branches. The Main Hub also collects the flow of fluid from the bypass branches and should be designed to support the stresses of the Rigid Jumper.
2) Locking cover (main hub): Similar to those used in interface equipment, that is, with features to test the connection/remediate and combat hydrates by pressurization/depressurization and filling with monoethylene glycol, MEG, in the section between the shunt valves and the top face of the main hub.
3) Service hub: Responsible for the access to the launcher/receiver (20) in the pre-commissioning phases and in case of contingency. The Service Hub should preferably be horizontal in line with the nominal pipe of the PLET (30), however it can be vertical, provided that it meets the minimum pigability requirements and can operate with the Rigid Jumper connected to the Main Hub.
4) Locking cover (service hub): Responsible for providing a secondary sealing barrier between the medium and the PLET (30). It should be provided with features to allow the installation/test of connection/uninstallation of the PRE-COM SPL over the service life of the PLET (30).
5) Main valve (for access to the Service Hub). Responsible for providing the primary sealing barrier between the medium and the PLET, and the pigable access to the pre-commissioning launcher/receiver (20), a phase known as PRECOM. The main access valve to the Service Hub must be placed in the horizontal section upstream of the curved section.
6) Bypass valves (for access to the main hub): Responsible for providing a primary sealing barrier between the medium and the PLET (30) and providing through operational maneuvers the receipt/launch of safely instrumented pigs;
7) Branches (for access to the main hub): Responsible for the passage of fluid from the pipeline, comprising a main branch and 2 bypasses.
8) Nominal Pipe (for access to main hub): Responsible for launching/receiving the instrumented pig intended for the bi-directional and periodic pigging of the pipeline.
9) Equalization lines: Responsible for the equalization of upstream and downstream pressures of the Pig at the Main Hubs (1) and Service HUB (3); are applicable and arranged according to the scope of the requirements set forth in the guidelines and standards considered in the equipment design.
10) Set of instruments required to monitor the operation of the station and comprises: subsea corrosion probes, valve placement mechanisms, detectors of the passage and location of pigs and TPT indicators.

The solution as proposed met the need of the project area by providing another technical and competitive alternative in the options of subsea technologies for future projects of export pipelines for the existing networks of the Santos Basin, leaving the decision to use it or not being restricted to economic and market criteria when compared to other applicable alternatives.

The invention claimed is:
1. A subsea pig launcher and receiver comprising:
a main hub;
a service hub;
a main valve;
shunt valves;
a first locking cover for the main hub, wherein the first locking cover is configured for connection testing/ remediation, combat of hydrates by pressurization/ depressurization, and/or filling with monoethylene glycol;

a second locking cover for the service hub, wherein the second locking cover is configured to allow installation of connection of a pre-commissioning subsea pig launcher;

branches;

a nominal pipe in fluid communication with the main hub, wherein the nominal pipe is configured to launch and/or receive an instrumented pig provided to bi-directional and periodic pigging of a pipeline;

equalization lines; and an instrument assembly.

2. The subsea pig launcher and receiver of claim 1, wherein the main hub interconnects to surface equipment.

3. The subsea pig launcher and receiver of claim 1, wherein the service hub is configured to allow access to the subsea pig launcher in pre-commissioning phases and in case of need in contingency.

4. The subsea pig launcher and receiver of claim 3, wherein the service hub is horizontally or vertically in line with a pipeline end termination nominal pipe.

5. The subsea pig launcher and receiver of claim 1, wherein the main valve is configured to provide a primary sealing barrier.

6. The subsea pig launcher and receiver of claim 5, wherein the main valve is in a horizontal section, upstream of a curved section.

7. The subsea pig launcher and receiver of claim 1, wherein the shunt valves provide a primary sealing barrier, provide through operational maneuvers, and provide a safe receipt/launch of instrumented pigs.

8. The subsea pig launcher and receiver of claim 1, wherein the branches are responsible for passage of fluid of a pipeline and comprise a main branch and two bypasses.

9. The subsea pig launcher and receiver of claim 1, wherein the instrument assembly comprises subsea corrosion probes, valve placement mechanisms, detectors of passage, and location of pigs and indicators.

* * * * *